United States Patent [19]
Whitehead

[11] Patent Number: 4,615,579
[45] Date of Patent: Oct. 7, 1986

[54] PRISM LIGHT GUIDE LUMINAIRE

[75] Inventor: Lorne A. Whitehead, Vancouver, Canada

[73] Assignee: Canadian Patents & Development Ltd., Ottawa, Canada

[21] Appl. No.: 527,501

[22] Filed: Aug. 29, 1983

[51] Int. Cl.$^4$ .................................................. G02B 6/00
[52] U.S. Cl. ..................................... 350/96.1; 350/259
[58] Field of Search ............... 350/102, 103, 259, 262, 350/265, 286, 96.32, 96.28, 96.1, 96.29, 96.24

[56]  References Cited
U.S. PATENT DOCUMENTS

| | | | |
|---|---|---|---|
| 2,714,816 | 8/1955 | Pennell | 350/259 |
| 4,260,220 | 4/1981 | Whitehead | 350/96.28 |
| 4,459,642 | 7/1984 | Mori | 350/259 X |

FOREIGN PATENT DOCUMENTS

| | | | |
|---|---|---|---|
| 4141 | 4/1897 | Canada | 350/259 |
| 2028561 | 3/1980 | United Kingdom | 350/96.24 |

*Primary Examiner*—William L. Sikes
*Assistant Examiner*—Lester Rushin
*Attorney, Agent, or Firm*—Edward Rymek

[57] ABSTRACT

The luminaire for a prism light guide system consists of a longitudinal hollow structure made of transparent dielectric material. The structure has inner and outer surfaces which are in octature, and at least a portion of one outer surface that has a light release mechanism. The light release mechanisms include a non-planar surface, a rough outer surface, or round corners in a corrugated outer surface. The luminaire can further include a device positioned within the hollow structure for increasing the divergence angle $\theta$ of the light. It can consist of a diffusion screen or a mirror. Some of the walls may also be covered by a reflective material to redirect any escaping light back into them.

10 Claims, 9 Drawing Figures

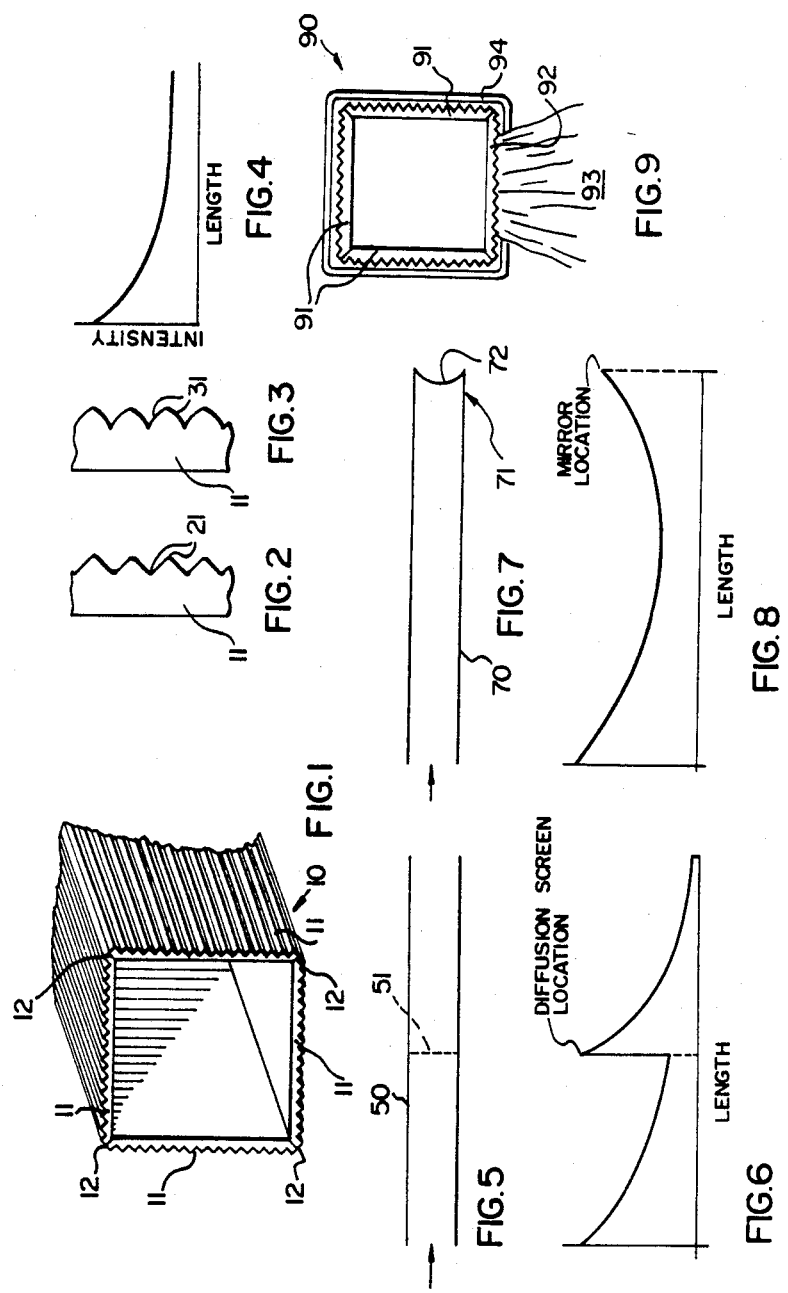

PRISM LIGHT GUIDE LUMINAIRE

BACKGROUND OF THE INVENTION

This invention is directed to luminaires for the distribution of light into an area, and in particular, to luminaires for use with prism light guides.

In U.S. Pat. No. 4,260,220, which issued on Apr. 7, 1981, in the name of Lorne A. Whitehead, a prism light guide is described by which light can be transmitted extensive distances. This system permits the lighting of an area using a central source of light such as the sun, or some other source which is conveniently located.

SUMMARY OF THE INVENTION

It is therefore an object of this invention to provide a luminaire for use with the prism light guide system.

This and other objects of the invention are achieved in a luminaire comprising a longitudinal hollow structure made of transparent dielectric material, said structure having inner and outer surfaces which are in octature and wherein at least a portion of one outer surface has a light release mechanism. The release mechanism can consist of one or more of the following:

(a) a non-planar surface,
(b) a rough outer surface, or
(c) round corners in an outer corrugated surface.

In accordance with another aspect of the invention, the luminaire may further include means within the hollow structure for increasing the divergence angle $\theta$ of the light. These can include diffusion screens and/or mirrors. The mirror should not be both perpendicular to the axis of the luminaire and planar.

With regard to another aspect of the invention, the hollow structure of the luminaire has a rectangular cross-section formed by four walls, each of the walls having an inner and outer surface in octature, with at least one of the walls having a light release mechanism. In addition, the remaining walls are covered by a highly reflective material to reflect any light back through the walls.

Many other objects and aspects of the invention will be clear from the detailed description of the drawings.

BRIEF DESCRIPTION OF THE DRAWINGS

In the drawings:

FIG. 1 illustrates a luminaire in accordance with the present invention;

FIG. 2 illustrates an example of a light release mechanism;

FIG. 3 illustrates a second example of a light release mechanism;

FIG. 4 is a graph showing the intensity of light released along a luminaire;

FIG. 5 is a schematic of a luminaire with a diffusion screen;

FIG. 6 is a graph of the intensity of released light in a luminaire with a diffusion screen;

FIG. 7 is a schematic of a luminaire with a mirror;

FIG. 8 is a graph of the intensity of released light in a luminaire with a mirror; and FIG. 9 illustrates a further embodiment of a luminaire in accordance with the present invention.

DETAILED DESCRIPTION

As described in the above noted U.S. Pat. No. 4,260,220, which is incorporated herein by reference, the prism light guide is a longitudinal hollow structure made of transparent dielectric material wherein the walls have planar inner and outer surfaces which are in octature. The term octature for a given section of the structure, signifies that:

(1) all of the inner surfaces of a section, i.e. the surfaces of a section in the hollow air-space are either perpendicular or parallel to one another,
(2) the outer surfaces of a section are either perpendicular or parallel to one another, and
(3) finally, the inner surfaces are at a 45° angle to the outer surfaces.

This light guide maintains a beam within its structure as long as the beam directional angle $\theta$ is less than a predetermined maximum value depending on the refractive index $\eta$ of the dielectric material as determined by the equation:

$$\theta_{max} = \cos^{-1}\left(\frac{1 - \eta^2 \sin^2(22.5°)}{1 - \sin^2(22.5°)}\right)^{\frac{1}{2}}$$

For an acrylic plastic with $\eta = 1.5$, $\theta_{max}$ is 27.6°.

The prism light guide will, therefore, deliver a beam of light having a predetermined spatial distribution depending on the size of the guide and an angular distribution between $-\theta_{max}$ and $+\theta_{max}$. A luminaire 10 for such a light guide system is illustrated in FIG. 1. The luminaire 10 consists of four walls 11 made from sheets of clear dielectric material wherein the inner and outer surfaces are in octature in a similar manner as the light guide itself and with matching cross-section. The walls 11 are fixed together at corners 12. In addition however, at least the walls 11 through which it is desired for the light to be released, are made to include one or more light release mechanisms. One release mechanism for the luminaire consists of round corners 21 where surfaces meet to form the outer corrugated walls 11, as shown in FIG. 2. A second release mechanism consists of non-planar surfaces on the outer corrugated walls 11, as shown in FIG. 3. A third release mechanism consists of surface roughness on the outer corrugated walls 11. All of these release mechanisms allow light to be released from the luminaire 10 in a controlled manner.

When light enters one end of the luminaire 10, it is released along its length, and therefore, the intensity of the light within the luminaire 10 decreases along the length of the luminaire 10. A graph of the light intensity in such a luminaire is shown in FIG. 4. However, it is usually desired to make the brightness of the light substantially constant along the length of the luminaire. The brightness B of the released light along the length of the luminaire is a function of the intensity I of the light in the luminaire at that point, the angular divergence $\theta$ of the light and the release fraction F per reflection, i.e. $B \propto I\theta F$. By increasing the release mechanisms along the luminaire length, the release fraction F will increase allowing B to remain constant along the luminaire length. This technique can, however, produce manufacturing problems since these release mechanism must vary along the length of the luminaire in a complex fashion.

A second technique for producing a desired brightness B profile consists of modifying the divergence angle $\theta$ of the light in luminaire. This may be accomplished through the use of one or more diffusion screens in the luminaire, as shown schematically in FIG. 5, or through the use of mirrors, as shown schematically in FIG. 7. In FIG. 5, a diffusion screen 51, which is made from a translucent material, is placed at the center of the luminaire 50. The screen 51 will cause an abrupt change in the divergence angle $\theta$ of the light passing through it in the luminaire, releasing the light with an abrupt increase in intensity as shown in the graph in FIG. 6.

In FIG. 7, a mirror 72 is located at the end 71 of the luminaire 70. This causes the light that reaches the end 71 to be reflected and at the same time its divergence angle $\theta$ to be increased. The brightness will, therefore, be greater at the end 71 than at the center of the luminaire 70 as shown in FIG. 8. In particular, by careful choice of the degree of increase of the divergence angle $\theta$, it is possible to have the same brightness B level at both ends of the luminaire 70. Though a convex mirror 71 is shown in FIG. 7, the divergence angle $\theta$ may be increased by other types of mirror as long as the mirror is both not perpendicular to the axis and planar.

As noted above, with respect to FIG. 1, the luminaire 10 may have one or more of its walls 11 made from sheets of dielectric material having inner and outer surfaces in octature, however, with release mechanisms. The remaining walls may be highly reflective due to mirrored surfaces which absorb some of the light, or due to prism light guide walls with the surfaces in octature. However, by using release mechanisms in one or more of the walls, and/or diffuse screens or mirrors in the luminaire, some of the light will escape through the prism light guide walls. To prevent this, all of the outer surfaces through which it is not desired to have light escape, can, as shown in FIG. 9, be covered by a surface which is hightly reflective and which is not a flat specular reflector, such that the reflected rays have a higher probability of passing back through the prism light guide wall of the luminaire. A diffuse reflective material would be ideal to form such a surface. This luminaire 90 has three prism light guide walls 91, and one wall 92 with release mechanisms for releasing light 93. In addition, the three walls 91 are covered with a highly reflective diffuse material 94, such as mirrors, white paint, white plastic, white paper or white fabric. The material 94 will reflect any escaping light back into the luminaire 90 so that it can be released through the desired surface 92.

Many modifications in the above described embodiments of the invention can be carried out without departing from the scope thereof and, therefore, the scope of the present invention is intended to be limited only by the appended claims.

I claim:

1. A luminaire for a prism light guide system comprising a longitudinal hollow structure made of transparent dielectric material for receiving along its length a beam of light having a predetermined spatial distribution and divergence angle from the light guide system, said structure having inner and outer surfaces which are in octature for containing said beam of light and wherein at least a portion of one outer surface has a light release mechanism therein such that light having angular distribution of less than an angle $\theta_{max}$ is released from the luminaire surface in a controlled manner.

2. A luminaire as claimed in claim 1 wherein the release mechanism is a non-planar surface.

3. A luminaire as claimed in claim 1 wherein the release mechanism is a rough outer surface.

4. A luminaire as claimed in claim 1 wherein the luminaire further includes means within the hollow structure for increasing the divergence angle of at least a portion of the light in the beam to release that portion from the luminaire.

5. A luminaire as claimed in claim 4 wherein the divergence angle increasing means is at least one diffusion screen located across the hollow structure.

6. A luminaire as claimed in claim 4 wherein the divergence angle increasing means is a mirror for reflecting a portion of the beam so as to increase its divergence angle to produce substantially equal brightness at the ends of the luminaire.

7. A luminaire as claimed in claim 1 wherein the hollow structure has a rectangular cross-section formed by four walls for matching the cross-section of the light guide system each of the walls having an inner and outer surface in octature and at least one of the walls having a light release mechanism.

8. A luminaire as claimed in claim 7 wherein the remaining walls are covered by a reflective material for redirecting escaping light back through the walls.

9. A luminaire as claimed in claim 8 wherein the reflective material is a highly reflective diffuse material.

10. A luminaire as claimed in claim 7 wherein the light release mechanism increases along the length of the luminaire such that the brightness of the released light is substantially constant along its length.

* * * * *